United States Patent [19]

Freire et al.

[11] Patent Number: 5,779,363
[45] Date of Patent: Jul. 14, 1998

[54] CAPILLARY CALORIMETRIC CELL AND METHOD OF MANUFACTURING SAME

[75] Inventors: Ernesto Freire; Vincent V. Kavina; George P. Privalov; Peter L. Privalov, all of Baltimore, Md.

[73] Assignee: The Johns Hopkins University, Baltimore, Md.

[21] Appl. No.: 534,987

[22] Filed: Sep. 27, 1995

[51] Int. Cl.$^6$ .................... G01K 17/00; G01K 17/06
[52] U.S. Cl. .................................... 374/33; 374/31
[58] Field of Search ..................... 374/31, 33, 29, 374/43; 165/168, 185, 165; 436/147; 422/51

[56] References Cited

U.S. PATENT DOCUMENTS

| 691,790 | 1/1902 | Mason | 165/168 |
| 897,792 | 1/1908 | Silvey | 165/168 X |
| 1,490,706 | 4/1924 | Madden | 165/168 |
| 4,343,988 | 8/1982 | Roller et al. | 165/165 X |
| 4,595,297 | 6/1986 | Liu et al. | 374/29 |
| 5,174,654 | 12/1992 | Droege | 374/43 X |

*Primary Examiner*—George M. Dombroske
*Assistant Examiner*—Joseph L. Felber
*Attorney, Agent, or Firm*—Cushman Darby & Cushman IP Group of Pillsbury Madison & Sutro, LLP

[57] ABSTRACT

A capillary calorimetric cell comprises a solid metallic block having a plurality of channels formed therein. Each channel has first and second ends opening to a first end face and a second end face, respectively, of the block. First and second members are disposed at the first and second end faces of the block, respectively, and cooperate with the block so that adjacent first ends and adjacent second ends of the channels are connected to thus form a single, continuous channel through the block.

19 Claims, 3 Drawing Sheets

CAPILLARY CALORIMETRIC CELL AND METHOD OF MANUFACTURING SAME

BACKGROUND OF THE INVENTION

1. Field of the Invention

The present invention relates to calorimetric cells. More particularly, the present invention relates to a capillary calorimetric cell for more precisely making measurements of heat loss or gain from solutions under study, and a method of manufacturing the same.

2. Related Art

Biological calorimetry measures heat effects in dilute aqueous solutions containing biological materials. Such heat effects can be related to association or binding reactions, enzymatic reactions, conformational changes in macromolecules, folding/unfolding reactions, etc. The reactions can be initiated by mixing two or more reactants or by increasing or decreasing the temperature of a solution as in the case of differential scanning calorimetry.

In all cases, however, it is necessary to measure the amount of heat released or absorbed in the reaction under consideration. Thus, it is important to optimize the rate of heat conduction to temperature sensors and to minimize heat gradients within the solutions contained in the capillary cells being used. These optimization methods are aimed at increasing instrument sensitivity and accuracy. Further, these methods are necessary as the temperature sensors are normally placed on the outer surface of the capillary cells and the rate of heat transfer through the solution within the cell is slow.

In microcalorimetry, which deals with small volumes of material under study, a general optimization method involves the design of calorimetric reaction cells with very small internal wall-to-wall dimensions and large internal surface to volume ratios. The best way in which to maximize the rate of heat transfer from the place of the chemical reaction to the temperature sensors is to place the solution under study in a capillary constructed of highly heat conductive material that is placed directly in contact with the sensors. The capillary cells are intended to minimize spurious signals that might be caused by sampling, precipitation, or large heat gradients within the solution under study.

Capillary cells can be used in differential scanning calorimeters, continuous flow calorimeters, and other types of reaction calorimeters. Traditional capillary cells are made of capillary tubes shaped in the form of coils wrapped about a solid block of material, which is then placed in contact with the temperature sensors. This multi-stage construction introduces thermal boundaries and uneven heat flows in the calorimetric cell.

Currently, the Russian company Biopribor manufactures a differential scanning calorimeter that uses capillary cells. The model is known as the DASM-4. The calorimetric cells of the DASM-4 are made from platinum capillary tubes that are wrapped around small cylinders made of stainless steel. After the coils are formed, they are soldered to the cylinders in order to improve heat exchange. However, the precision of calorimetric cells utilizing this technology is limited because the volume of such cells is difficult to control accurately. More specifically, due to the bending process in forming the capillary tubes around the cylinders, the capillary tube changes its cross-sectional profile from a circle to an ellipsoid. As a result, the final volume of the coiled tube is less than the initial volume of the original tube. More importantly, the volume of the cell is not well reproduced. In addition, the process has a low yield because the tubes are often formed incorrectly and are subject to breakage during bending. In addition, the manufacturing process used in making such cells is extremely labor intensive.

The ideal material for such capillary cells is gold, which is chemically inert and has a relatively high coefficient of heat conductivity. However, it is extremely difficult to solder gold without having amalgamation difficulties. Ideally, the capillary cell and the cylinder must be made of material having the same thermal expansion coefficient. If the capillary cells are made of platinum, the choice of material for the cylinder is stainless steel, which has a similar coefficient of thermal expansion. However, stainless steel has a very low coefficient of heat conductivity. Finding materials that are chemically inert and which have a high coefficient of heat conductivity as well as similar coefficients of thermal expansion is quite difficult.

Another limitation associated with the cell made by coiling a capillary tube around a cylinder is that it does not have a flat surface, thus precluding the direct use of standard semiconductor sensors that have much greater sensitivities than conventional thermopiles.

SUMMARY OF THE INVENTION

It is an object of the present invention to provide a high precision capillary cell which eliminates the limitations associated with the multi-stage construction of the conventional capillary cell. A capillary cell has thus been constructed in such a manner that it minimizes uneven heat flow and is adapted to be placed in direct contact with highly sensitive semiconductor temperature sensors. Also, the capillary cell minimizes spurious signals due to sample settling, precipitation, or large temperature gradients. In addition, the capillary cell of the present invention facilitates filling and cleaning.

In accordance with the present invention, there is provided a capillary calorimetric cell comprising a solid metallic block having a plurality of channels formed therein. Each channel has first and second ends opening to a first end face and a second end face, respectively, of the block. First and second members are disposed at the first and second end faces of the block, respectively, and cooperate with the block so that adjacent first ends and adjacent second ends of the channels are connected to thus form a single, continuous channel through the block.

Another object of the present invention is to produce a capillary cell for microcalorimeters with optimal thermochemical properties by using standard, relatively simple manufacturing procedures such as drilling, milling, and fusion. This enables the costs associated with manufacturing to be decreased, and also improves the efficiency of the process and the precision of the resulting cells.

To accomplish this object the present invention provides a method for manufacturing a capillary calorimetric cell formed from a solid block having a single, continuous channel formed therein. The method comprises the steps of: providing a solid block of material; forming a plurality of parallel capillary channels in the block; sequentially connecting the capillary channels so as to form the single, continuous channel having an inlet and an outlet from the block.

Other objects, features and advantages of the present invention, as well as the interrelationship between related elements and the economies of manufacture, will become apparent to those skilled in the art by a study of the following detailed description, the appended claims and drawings, all of which form a part of this specification.

DETAILED DESCRIPTION OF THE PRESENTLY PREFERRED EXEMPLARY EMBODIMENT

Figure 1:
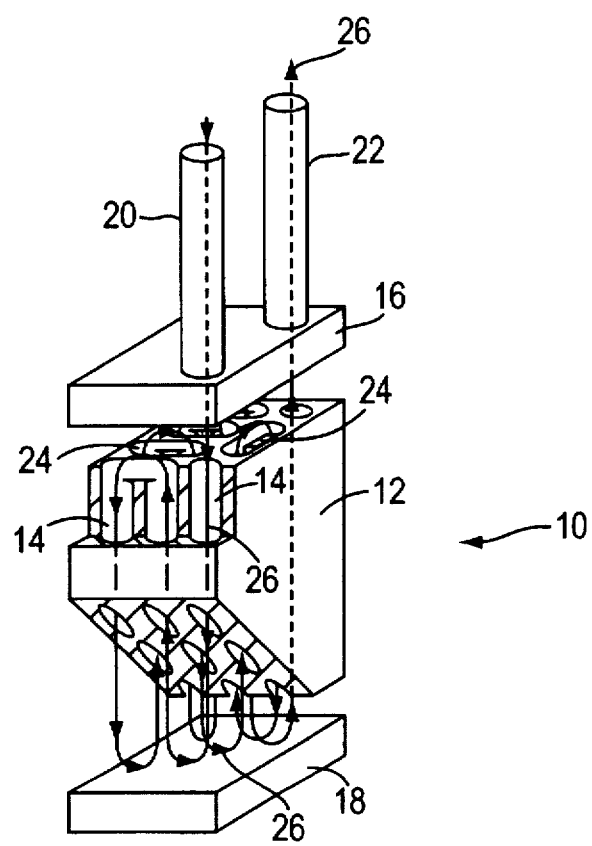
FIG. 1 is a partially cut away perspective view illustrating a first embodiment of the present invention.
Figure 2C:
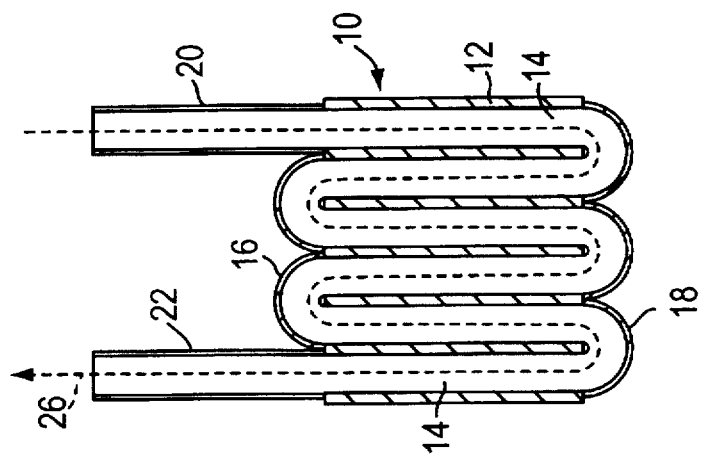
FIG. 2C is a cross sectional view of a third embodiment of the present invention.

FIG. 1 illustrates a capillary cell 10 according to the present invention. The capillary cell 10 is formed from block 12 having a plurality of parallel, straight channels 14 drilled therethrough. Preferably, the channels are evenly spaced from one another within the block 12, and are provided by any conventional drilling technique. The ends of the blocks are capped by caps 16 and 18 so as to connect the channels in a desired sequence to form a single, continuous capillary channel connected to the outside by one inlet port 20 and one outlet port 22. Caps 16 and 18 may be flat plates, as pictured in FIG. 1 and the cross-sectional view of FIG. 2A, in which case adjacent channels in the cell body are connected by openings 24 carved in end faces of block 12, for example, by a milling operation. The connecting caps are preferably made from the same material as the block, and are fused, soldered, or glued to the cell body. Both the caps 16 and 18 as well as the block 12 should be formed of a metal material that is chemically inert and has a high coefficient of heat conductivity, e.g., gold. Most preferably pure, twenty-four karat gold is used. Arrow 26 indicates the flowpath of solution through cell 10.

As shown in FIG. 1, inlet and outlet tubes 20 and 22, respectively, are soldered or otherwise attached to the outlet and inlet ports formed in cap 16. Inlet and outlet tubes 20 and 22 are preferably made from a chemically inert and low heat conductive material, preferably platinum.

Figure 2B:
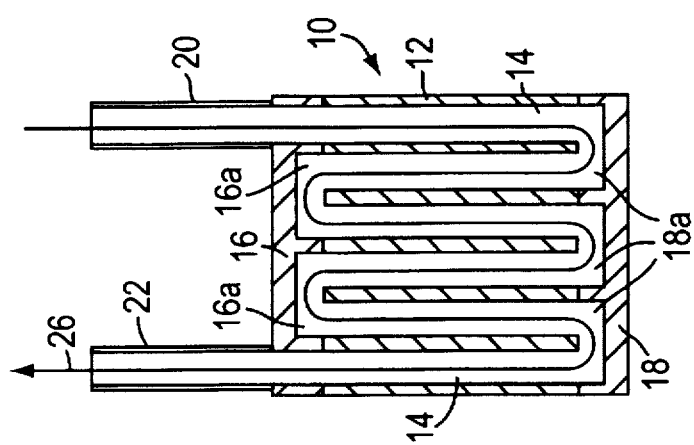
FIG. 2B is a cross sectional view of a second embodiment of the present invention.
Figure 2A:
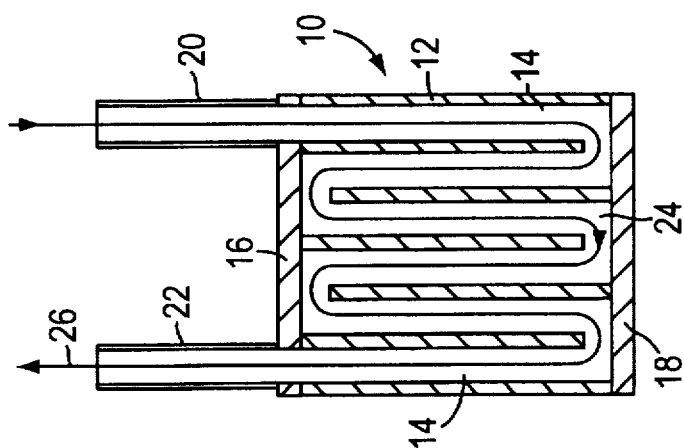
FIG. 2A is a cross sectional view of the first embodiment of the present invention.

In a second embodiment, no openings 24 are carved or otherwise provided in the block 12. Instead, as shown in FIG. 2B, the caps 16 and 18 may have openings or incisions 16a and 18a, respectively, formed therein to provide the connection between adjacent channels. In this embodiment, the channels 14 all terminate at the end faces of block 12. The caps 16 and 18 may also have complicated shapes, such as the semi-circular configuration depicted in FIG. 2C. Any of these embodiments are effective, provided that the adjacent, parallel channels are connected so as to form a single, continuous channel once the caps are attached to the block.

Because the cell 10 has both an inlet tube 20 and an outlet tube 22, the cell 10 can be much more easily cleaned (by flushing a cleaning fluid through the block) than conventional cells in which only a single common inlet/outlet tube is used.

Figure 3:
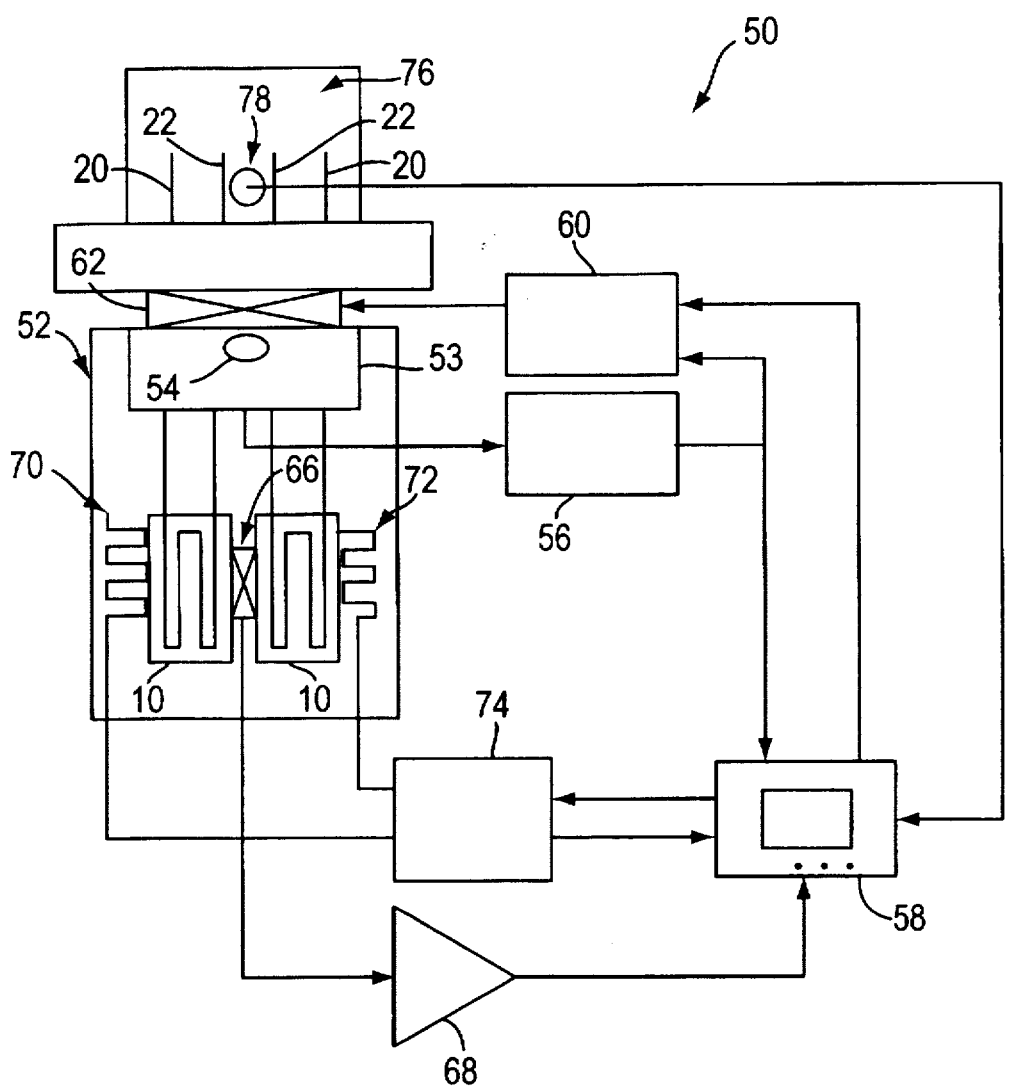
FIG. 3 is a schematic block diagram showing a scanning calorimeter as an exemplary application of the capillary cell manufactured in accordance with the present invention.

FIG. 3 is a schematic block diagram showing a scanning calorimeter 50 as an exemplary embodiment which employs a pair of capillary cells 10 manufactured in accordance with the present invention. The scanning calorimeter is used for studying the heat capacity of liquids across a broad temperature range.

In FIG. 3, the pair of capillary cells 10 are provided within a copper or silver thermal jacket 52. The thermal jacket 52 has a copper block 53 mounted therein. The copper block 53 has passages therein that permit inlet and outlet tubes 20, 22 to extend therethrough. The inlet and outlet tubes 20, 22 make good thermal contact with the copper block 20 so that the copper block is maintained generally at the same temperature as the cells 10. The heating or cooling of the cells 10 is provided by the heat transfer from the copper block 53 of jacket 52 through the platinum capillary inlet and outlet tubes 20, 22 that are in thermal contact with the jacket 52.

The thermal jacket 52 is heated and cooled at a constant rate. The temperature of the jacket is measured by the combination of a platinum thermometer 54, and a temperature measuring circuit 56, which sends a signal to a computer 58 based on the temperature detected by the thermometer 54. The computer 58 converts this signal to a reference voltage based upon a desired temperature of the jacket, which is a function of the scanning rate and time. This reference voltage is sent to a temperature control circuit 60, which compares the reference voltage from the computer with the voltage detected by the platinum thermometer 54 and measured by measuring circuit 56. Based on this comparison, the temperature control circuit 60 determines an appropriate power response for heating and cooling Peltier elements 62 necessary to minimize the difference between the two voltages. As a result, the computer 58 has a direct linear control of the temperature of the jacket 52, and the cells 10 are heated and cooled at any desired constant rate. However, for practical reasons, the maximal heating rate of the instrument is set at 2 K/min. The minimal heating rate does not have a limit.

Another feature of the calorimeter 50 is that semiconductor thermobatteries 66 are used as temperature sensors disposed in contact between cells 10. Although semiconductor batteries 66 are much more efficient than their bi-metal counterparts, the trade off is that some properties of semiconductor thermobatteries (heat conductivity and efficiency) are temperature dependent. To avoid this problem, a power compensation approach is used. More specifically, the temperature difference between the two cells is measured by the semiconductor thermobatteries 66 and amplified by a signal amplifier 68. This temperature difference is maintained near zero by applying the appropriate power differential using electric heaters 70, 72 attached directly to the flat exterior of cells 10. The heaters are controlled by the computer 58 and a power compensation bridge 74.

A manostat 76 provides an enclosed chamber for the open ends of the inlet tubes 20 and outlet tubes 22 of the cells 10. The excess pressure in the manostat 76 is set by a piston (not shown). The magnitude of such pressure is measured by a piezoelectric sensor 78, and is displayed by the computer monitor.

While the calorimetric capillary cell of the present invention has thus been described in conjunction with a scanning calorimeter as an example of one particular application therefor, it should be recognized that this capillary cell has several other applications, such as in continuous flow calorimeters and other types of calorimeters, for example.

This invention has been described in connection with what are presently considered to be practical and preferred embodiments. However, the present invention is not to be limited to the disclosed embodiments, but rather is meant to encompass all modifications and alternate arrangements included within the spirit and scope of the appended claims.

What is claimed is:

1. A calorimeter comprising:
   a pair of capillary calorimetric cells, each including
   i) a solid metallic block having a plurality of channel portions formed therein, each channel portion having a first end and a second end opening to a first end face and a second end face, respectively, of said block,
   ii) a first cap member and a second cap member disposed at said first end face and said second end face of said block respectively, adjacent first ends of selected ones of said channel portions being connected to one another and adjacent second ends of selected ones of said channel portions being connected to one another to thus form a single, continuous channel; and
   iii) an inlet and an outlet constructed and arranged to establish communication at opposite ends of said single continuous channel;
   a temperature sensor disposed in contact with said pair of capillary calorimetric cells for determining a temperature difference between said cells;
   a pair of heaters, each disposed in contact with a respective one of said capillary calorimetric cells; and
   a control system operatively connected with said temperature sensor and said pair of heaters, said control system constructed and arranged to detect and regulate a temperature of said pair of capillary calorimetric cells.

2. The calorimeter as claimed in claim 1, wherein for each capillary calorimetric cell said first cap member and said second cap member are formed from a same metal material as said metallic block.

3. The calorimeter as claimed in claim 2, wherein said metal material comprises gold.

4. The calorimeter as claimed in claim 1, wherein for each capillary calorimetric cell said inlet and outlet comprise tubes joined to one of said first cap member and said second.

5. The calorimeter as claimed in claim 4, wherein said tubes are formed of a material being chemically inert and having a low heat conductivity.

6. The calorimeter as claimed in claim 5, wherein said material comprises platinum.

7. The calorimeter as claimed in claim 1, wherein for each capillary calorimetric cell said first cap member and said second cap member include cooperating means said cooperating means including grooves formed in said first cap member and another of said cooperating means including grooves formed in said second cap member.

8. The calorimeter as claimed in claim 1, wherein for each capillary calorimetric cell said first end face and said second end face each include cooperating means, one of said cooperating means includes grooves formed in said first end face connecting said adjacent first ends and said adjacent second ends of said plurality of channel portions and another of said cooperating means includes grooves formed in said second end face connecting said adjacent first ends and said adjacent second ends of said plurality of channel portions.

9. A method for manufacturing a capillary calorimetric cell formed as a solid block having a single, continuous channel formed therein, said method comprising:
   providing a solid block of metal material;
   subsequently forming a plurality of parallel capillary channel portions in said block; and
   connecting said capillary channel portions so as to form said single, continuous channel having an inlet and an outlet from said block.

10. The method as claimed in claim 9, wherein said forming said plurality of capillary channel portions includes drilling said capillary channel portions in said block.

11. The method as claimed in claim 9, wherein said connecting said capillary channel portions includes attaching members to said block, one of said members and said block including cooperating means for cooperating with ends of said capillary channel portions so as to form said single, continuous channel.

12. The method as claimed in claim 11, wherein said step of connecting said capillary channel portions includes fusing said members to said block, said members being formed of a same metal material as said block.

13. The method as claimed in claim 9, wherein said inlet and said outlet comprise tubes soldered to an entrance and an exit of said single, continuous channel.

14. The calorimeter as claimed in claim 1, wherein said temperature sensor comprises semiconductor thermobatteries.

15. The calorimeter as claimed in claim 1, further comprising:
   a thermal jacket housing said pair of capillary calorimetric cells;
   a second block mounted within said thermal jacket;
   a thermometer being in thermal contact with said second block;
   a temperature measuring circuit receiving a signal from said thermometer indicating a temperature;
   means for converting a signal from said temperature measuring circuit to a reference voltage based on a desired temperature of said thermal jacket;
   a temperature controller receiving said signal from said temperature measuring circuit and said reference voltage from said converting means and determining a power response;
   a heating and cooling element disposed outside of said thermal jacket and in thermal contact with said second block, said heating and cooling element receiving said power response from said temperature controller.

16. The calorimeter of claim 15, wherein:
   said second block, said inlet, and said outlet are in thermal contact, and said thermal contact causes a temperature of said second block to be maintained at about a same temperature as said pair of capillary calorimetric cells.

17. The method as claimed in claim 9, wherein said step of connecting said capillary channels portions includes forming openings within a first end face of said solid block and a second end face of said solid block so as to connect selected adjacent capillary channel portions to form said single continuous channel.

18. The method as claimed in claim 17, said step of forming openings comprises carving said openings by milling.

19. The method as claimed in claim 9, wherein said step of connecting said capillary channel portions includes:
   forming openings within a first cap member and a second cap member so as to connect selected adjacent ones of said capillary channels when said first member and said second member are disposed at a first end face and a second end face of said solid block.

* * * * *